United States Patent
Moeller (10) Patent No.: US 9,385,770 B2
(45) Date of Patent: Jul. 5, 2016

(54) ARRAYED ANTENNA FOR COHERENT DETECTION OF MILLIMETERWAVE AND TERAHERTZ RADIATION

(71) Applicant: Lothar Benedikt Moeller, Middletown, NJ (US)

(72) Inventor: Lothar Benedikt Moeller, Middletown, NJ (US)

( * ) Notice: Subject to any disclaimer, the term of this patent is extended or adjusted under 35 U.S.C. 154(b) by 0 days.

(21) Appl. No.: 14/496,606

(22) Filed: Sep. 25, 2014

(65) Prior Publication Data
US 2016/0094257 A1 Mar. 31, 2016

(51) Int. Cl.
*H04L 27/08* (2006.01)
*H04B 1/18* (2006.01)

(52) U.S. Cl.
CPC .................................... *H04B 1/18* (2013.01)

(58) Field of Classification Search
CPC ............. H01Q 3/26; H01Q 3/30; H01Q 3/32; H01Q 3/267; H01Q 3/34; H04B 1/18; H04B 1/1036; H04L 27/2647
USPC .......... 375/260, 267, 316, 346–350; 342/368, 342/371–372, 374
See application file for complete search history.

(56) References Cited

U.S. PATENT DOCUMENTS

| | | | | |
|---|---|---|---|---|
| 4,731,614 A * | 3/1988 | Crane | ...................... | H01Q 3/42 342/372 |
| 5,952,964 A * | 9/1999 | Chan | ........................ | H01Q 3/22 342/368 |
| 6,388,631 B1 * | 5/2002 | Livingston | ............... | H01Q 3/24 342/374 |
| 7,167,698 B2 | 1/2007 | Katz | | |
| 7,550,734 B1 | 6/2009 | Lee et al. | | |
| 7,608,827 B2 | 10/2009 | Mitrofanov | | |
| 7,933,576 B2 | 4/2011 | Ji et al. | | |
| 8,054,224 B1 * | 11/2011 | de La Chapelle | ........ | H01Q 3/24 342/372 |
| 8,274,058 B1 | 9/2012 | Wanke et al. | | |
| 8,330,111 B2 | 12/2012 | Ojefors et al. | | |
| 8,558,745 B2 | 10/2013 | Habib et al. | | |
| 8,594,609 B2 | 11/2013 | Garcia et al. | | |
| 8,648,454 B2 | 2/2014 | Liu et al. | | |
| 2005/0035915 A1 * | 2/2005 | Livingston | ............. | H01Q 1/422 343/754 |
| 2006/0081889 A1 | 4/2006 | Shur et al. | | |
| 2006/0239688 A1 | 10/2006 | Hillis et al. | | |

(Continued)

OTHER PUBLICATIONS

Atesal, Yusuf A., et al., "Millimeter-Wave Wafer-Scale Silicon BiCMOS Power Amplifiers Using Free-Space Power Combining," IEEE Transactions on Microwave Theory and Techniques, vol. 59, No. 4, Apr. 2011, pp. 954-964.

(Continued)

*Primary Examiner* — Khanh C Tran (57) ABSTRACT

We disclose an arrayed antenna for reception of electromagnetic radiation from a millimeter-wave or terahertz range. In an example embodiment, individual antenna cells in the arrayed antenna are configured for coherent detection of the received electromagnetic radiation and are electrically connected with one another in a manner that causes each of the antenna cells to positively contribute to the overall gain of the arrayed antenna. In some embodiments, the arrayed antenna may have a network of electrical conductors that is configured to (i) collect and deliver the electrical output signals generated by the individual antenna cells to an output terminal of the arrayed antenna, (ii) deliver an electrical local-oscillator signal from a common local-oscillator source to the individual antenna cells, and (iii) deliver electrical DC power from a common power supply to electrical circuits in the individual antenna cells.

23 Claims, 5 Drawing Sheets

(56) References Cited

U.S. PATENT DOCUMENTS

| | | | | |
|---|---|---|---|---|
| 2007/0285316 | A1* | 12/2007 | Saily | H01Q 1/523 343/700 MS |
| 2012/0146869 | A1* | 6/2012 | Holland | H01P 5/10 343/795 |
| 2013/0258599 | A1* | 10/2013 | Danello | H01L 23/433 361/706 |
| 2014/0091376 | A1 | 4/2014 | Boppel et al. | |
| 2014/0198885 | A1* | 7/2014 | Holder | H04B 1/7097 375/347 |
| 2014/0210486 | A1* | 7/2014 | Dijkstra | H01Q 3/28 324/612 |

OTHER PUBLICATIONS

Orfanidis, Sophocles J., "Electromagnetic Waves and AntennasTransmitting and Receiving Antennas," http://www.ece.rutgers.edu/~orfanidi/ewa/, 2008 [retrieved on Jul. 2, 2014]. Retrieved from the Internet: < http://www.ece.rutgers.edu/~orfanidi/ewa/ch16.pdf> Chapter 16, pp. 740-774.

Gutierrez, Felix, Jr., "Millimeter-Wave and Sub-Terahertz On-Chip Antennas, Arrays, Propagation, and Radiation Pattern Measurements," Dissertation, The University of Texas at Austin, Doctor of Philosophy, Dec. 2013 (175 pages).

Emrick, Rudy M., "On-Chip Antenna Element and Array Design for Short Range Millimeter-Wave Communications," Dissertation for Doctor of Philosophy, Graduate School of The Ohio State University, 2007 (119 pages).

Rogalski, A., et al., "Terahertz Detectors and Focal Plane Arrays," Opto-Electronics Review, 2011, vol. 19, No. 3, pp. 346-404.

Chattopadhyay, Goutam, et al., "Terahertz Array Receivers with Integrated Antennas," IEEE International Workshop on Antenna Technology (iWAT), 2012, pp. 319-322.

Sadr, R., "Detection of Signals by the Digital Integrate-and-Dump Filter With Offset Sampling," TDA Progress Report 42-91, Jul.-Sep. 1987, pp. 158-173.

Chattopadhyay, Goutam, et al., "Development of Multi-Pixel Heterodyne Array Instruments at Submillimeter Wavelengths," Proceedings of the Asia Pacific Microwave Conference, New Delhi, India, Dec. 2004 (4 pages).

Rao, Sabbi Babu, "Design and Implementation of a GPS Receiver Channel and Multipath Delay Estimation Using Teager-Kaiser Operator," Master's Thesis, Department of Super Computer Education and Research Centre Indian Institute of Science Bangalore, India, 2009 (53 pages).

Gathman, Timothy D., et al., "An Integrate-and-Dump Receiver for High Dynamic Range Photonic Analog-to-Digital Conversion," IEEE 12th Topical Meeting on Silicon Monolithic Integrated Circuits in RF Systems (SiRF), 2012, pp. 155-158.

Cho, Deuk Jae et al., "An Efficient Signal Processing Scheme Using Signal Compression for Software GPS Receivers," International Journal of Control, Automation, and Systems, vol. 4, No. 3, Jun. 2006, pp. 344-350.

"Subharmonic Vs. Fundamental Mixers for High Capacity Millimeterwave Radios," Hittite Microwave Corporation, Manufacture Data Sheet, 2004, v00.1203 (8 pages).

Moeller, Lothar Benedikt, "Arrayed Antenna for Coherent Detection of Millimeter-wave and Terahertz Radiation," U.S. Appl. No. 14/496,606, filed on Sep. 25, 2014 (21.

* cited by examiner

ARRAYED ANTENNA FOR COHERENT DETECTION OF MILLIMETERWAVE AND TERAHERTZ RADIATION

CROSS-REFERENCE TO RELATED APPLICATIONS

The subject matter of this application is related to the subject matter of U.S. patent application Ser. No. 14/496,312, which is incorporated herein by reference in its entirety.

BACKGROUND

1. Field

The present disclosure relates to antennas and, more specifically but not exclusively, to arrayed antennas for coherent detection of millimeter-wave and terahertz radiation.

2. Description of the Related Art

This section introduces aspects that may help facilitate a better understanding of the disclosure. Accordingly, the statements of this section are to be read in this light and are not to be understood as admissions about what is in the prior art or what is not in the prior art.

As used herein, the term "millimeter wave" refers to electromagnetic radiation from a range of frequencies between about 30 GHz and about 300 GHz. It has received this name because the corresponding wavelengths are between about 1 mm and about 10 mm. In some literature, this frequency range is also referred to as the EHF (Extremely High Frequency) band. The term "terahertz radiation" refers to electromagnetic radiation from a range of frequencies between about 300 GHz and about 3 THz. Because terahertz radiation includes wavelengths between about 1 mm and about 0.1 mm, it is also referred to as the sub-millimeter waves, especially often so in astronomy.

Practical applications of millimeter waves and terahertz radiation include but are not limited to imaging systems, security scanners, automotive sensors, wireless communications, defense usages, such as radar, and medical applications. The design of corresponding antennas is typically application specific, with integration, loss, gain, and directivity requirements varying significantly among different applications. Some of the applications require or may benefit from the use of a high-gain low-directivity antenna.

SUMMARY OF SOME SPECIFIC EMBODIMENTS

Disclosed herein are various embodiments of an arrayed antenna for reception of electromagnetic radiation from a millimeter-wave or terahertz range. In an example embodiment, individual antenna cells in the arrayed antenna are configured for coherent detection of the received electromagnetic radiation and are electrically connected with one another in a manner that causes each of the antenna cells to positively contribute to the overall gain of the arrayed antenna. In some embodiments, the arrayed antenna may have a network of electrical conductors that is configured to (i) collect and deliver the electrical output signals generated by the individual antenna cells to an output terminal of the arrayed antenna, (ii) deliver an electrical local-oscillator signal from a common local-oscillator source to the individual antenna cells, and (iii) deliver electrical DC power from a common power supply to electrical circuits in the individual antenna cells.

In some embodiments, individual antenna cells may have antenna structures that cause the arrayed antenna to have relatively low directivity. The total number of antenna cells in the arrayed antenna may be relatively large to cause the arrayed antenna to have a relatively high gain.

According to one embodiment, provided is an apparatus comprising a plurality of antenna cells electrically connected with one another and configured to generate an electrical output signal in response to electromagnetic radiation from a millimeter-wave or terahertz range received by the plurality of the antenna cells. Each of the antenna cells is configured to perform coherent detection of the electromagnetic radiation and comprises (i) a respective antenna structure and (ii) a respective electrical down-converter circuit coupled to the respective antenna structure and configured to generate a respective component of the electrical output signal by mixing a first local oscillator signal and an electrical signal generated by the respective antenna structure in response to the electromagnetic radiation. The plurality of the antenna cells are electrically connected with one another to combine said respective components in a manner that causes the electrical output signal to have a greater power than a power of any of said respective components.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

According to "IEEE Standard Definitions of Terms for Antennas," an antenna is a "transmitting or receiving system that is designed to radiate or receive electromagnetic waves." In principle, an antenna can be of any suitable shape and size. Representative types of antennas are (i) a wire antenna, e.g., a dipole or loop; (ii) an aperture antenna, e.g., a pyramidal horn; (iii) a reflector antenna, e.g., a parabolic dish antenna; (iv) a microstrip antenna, e.g., a patch antenna, etc. An arrayed antenna comprises a plurality of nominally identical antenna elements or cells (each having a respective antenna structure and the corresponding electrical circuitry) of any selected type that are spatially arranged in any desired (e.g., regular or irregular) pattern and electrically connected to cause the electrical signals generated by the individual antenna elements to be in a specified amplitude and/or phase relationship with one another. The latter characteristic causes an arrayed antenna to operate as a single antenna, generally having improved characteristics compared to the corresponding characteristics of an individual antenna element.

Embodiments disclosed herein are generally related to an arrayed antenna for reception of electromagnetic radiation. For illustration purposes and without undue limitations, embodiments of the disclosed arrayed antennas are described as comprising dipole-antenna structures. Based on the provided description and without undue experimentation, one of ordinary skill in the art will be able to make and use arrayed antennas that comprise other types of antenna structures.

Figure 1A:
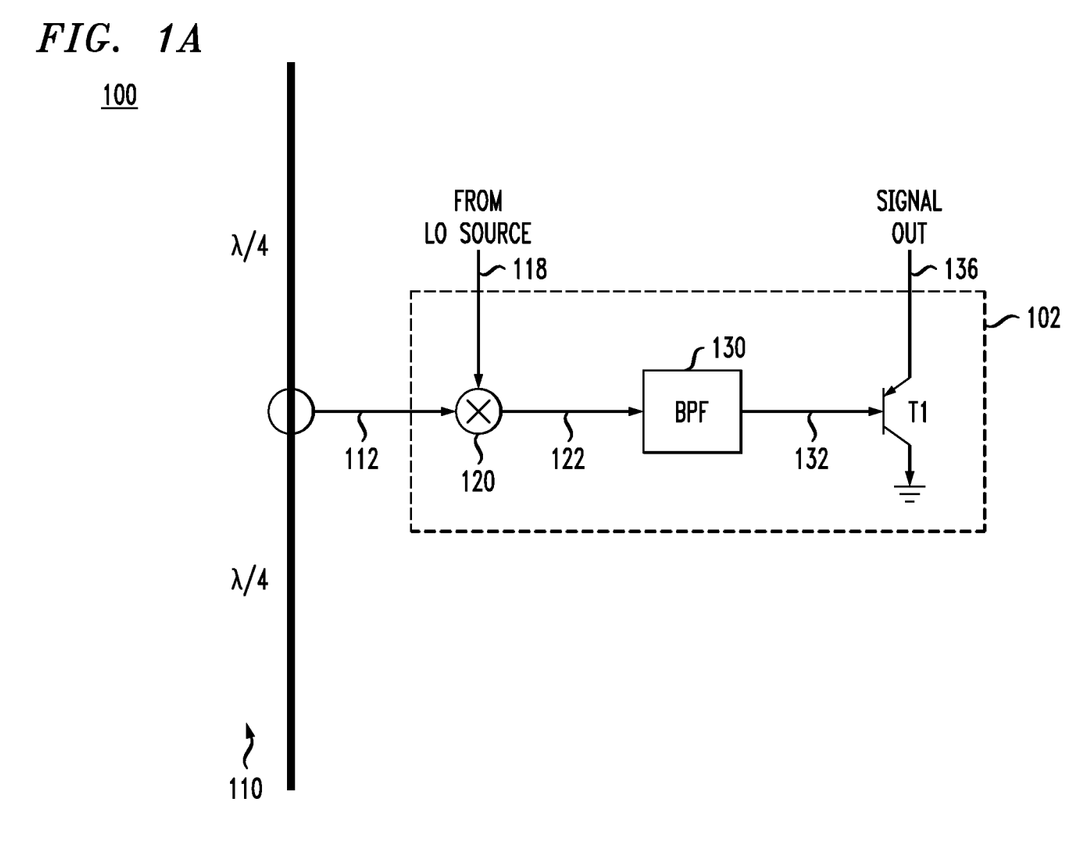
FIG. 1A shows a circuit diagram of an antenna cell according to an embodiment of the disclosure.

FIG. 1A shows a circuit diagram of an antenna cell 100 according to an embodiment of the disclosure. In response to electromagnetic radiation received from a remote millimeter-wave or terahertz source, antenna cell 100 operates to generate an electrical output signal 136. The generated electrical output signal 136 can then be used for an intended purpose in a device or circuit coupled to antenna cell 100. In one embodiment, the generated electrical output signal 136 can be used in the form of an electrical current. In an alternative embodiment, the generated electrical output signal 136 can be used in the form of a voltage.

Antenna cell 100 is designed and configured to perform coherent (e.g., heterodyne) detection of the received electromagnetic radiation and operates to convert it into a corresponding electrical current or voltage. As known in the art, coherent detection senses the electromagnetic field (as opposed to intensity or power) and, as such, can be sensitive to both the field's phase and the field's amplitude. While the received electromagnetic wave has a carrier frequency from the millimeter-wave or terahertz range, electrical output signal 136 generated by antenna cell 100 has a spectral content corresponding to the intermediate-frequency band that is centered around the difference frequency between the local oscillator signal and the carrier frequency of the received electromagnetic wave. Example signals in antenna cell 100 are graphically shown in FIGS. 1B-1D and further explained below.

Coherent detection of the received electromagnetic radiation carried out in antenna cell 100 should be distinguished from and contrasted with direct detection, wherein a local-oscillator signal is not used, and the power of the received millimeter-wave or terahertz signal is directly detected, e.g., using a Schottky diode. Embodiments of an arrayed antenna in which individual antenna cells are configured to carry out direct detection of the received electromagnetic radiation are disclosed, e.g., in the above-referenced concurrently filed patent application Ser. No. 14/496,312 by Lothar Moeller. In contrast, antenna cell 100 shown in FIG. 1A is configured to use an electrical local-oscillator (LO) signal 118 for the detection and down-conversion of the received millimeter-wave or terahertz signal, e.g., as further described below.

In an example embodiment, antenna cell 100 comprises a dipole-antenna structure 110, which is illustratively shown as having two electrically conducting arms, each having a length of approximately $\lambda/4$, where $\lambda$ is the wavelength of the electromagnetic radiation that antenna cell 100 is designed to handle. Dipole-antenna structure 110 is coupled to a sub-harmonic mixer 120 configured to mix an electrical signal 112 generated by the antenna structure in response to the received electromagnetic radiation with electrical LO signal 118 received from a local-oscillator source (not explicitly shown in FIG. 1A; see, e.g., FIG. 3) to generate a mixed electrical signal 122. Representative circuits that can be used to implement sub-harmonic mixer 120 in some embodiments of antenna cell 100 are disclosed, e.g., in U.S. Pat. Nos. 8,594,609, 7,933,576, 7,167,698, all of which are incorporated herein by reference in their entirety.

A band-pass filter 130 operates to filter mixed electrical signal 122 generated by mixer 120 to remove unwanted (e.g., higher- and/or lower-) frequency bands present therein. A resulting filtered electrical signal 132 is used to gate a field-effect transistor (FET) T1 as indicated in FIG. 1A. In an example embodiment, FET T1 may be configured to operate as a rectifier. A current flowing through the gated FET T1 is used to generate the above-mentioned electrical output signal 136.

Figure 1B:
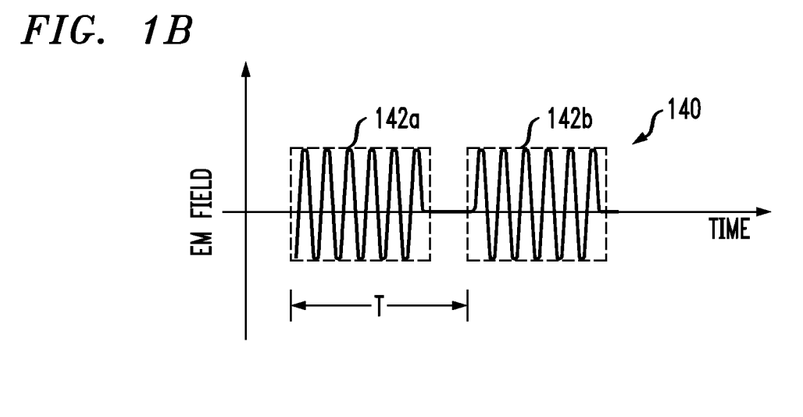
FIGS. 1B-1D graphically show example signals in the antenna cell of FIG. 1A according to an embodiment of the disclosure.

FIG. 1B graphically shows an example electromagnetic wave 140 that may be incident onto dipole-antenna structure 110 during operation of antenna cell 100. Electromagnetic wave 140 has (i) a carrier frequency from the millimeter-wave or terahertz range and (ii) an envelope comprising rectangular pulses 142a and 142b.

Figure 1C:
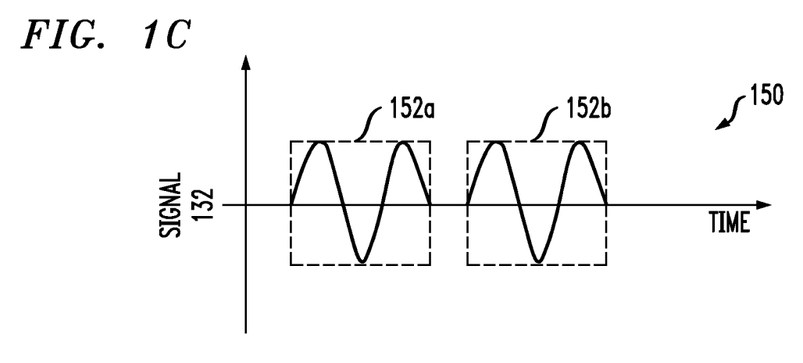

FIG. 1C graphically shows an example electrical waveform 150 that may be present in filtered electrical signal 132 generated in antenna cell 100 in response to electromagnetic wave 140 (FIG. 1B). Electrical waveform 150 has a frequency content corresponding to an intermediate frequency, which is determined by the frequency difference between the carrier frequency of electromagnetic wave 140 and the frequency of electrical LO signal 118. Electrical waveform 150 has an envelope comprising rectangular pulses 152a and 152b, wherein rectangular pulse 152a corresponds to rectangular pulse 142a, and rectangular pulse 152b corresponds to rectangular pulse 142b.

Figure 1D:
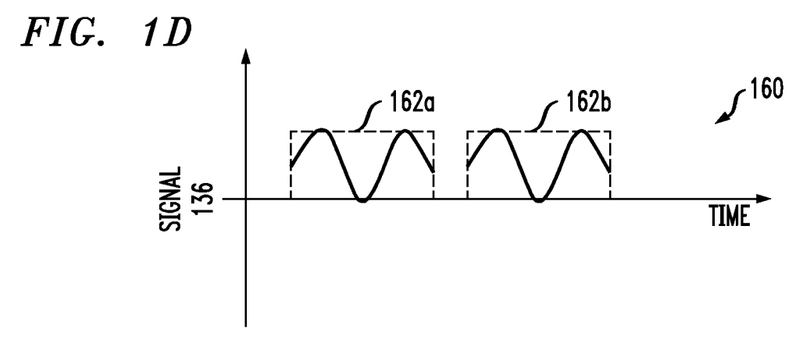

FIG. 1D graphically shows an example electrical waveform 160 that may be present in electrical output signal 136 generated in antenna cell 100 in response to electromagnetic wave 140 (FIG. 1B). Electrical waveform 160 has frequency content similar to that of electrical waveform 150 (FIG. 1C). However, unlike electrical waveform 150, electrical waveform 160 is unipolar, which causes it to swing from zero to positive full-scale, thus giving electrical waveform 160 a positive polarity. Electrical waveform 160 has an envelope comprising rectangular pulses 162a and 162b, wherein rectangular pulse 162a corresponds to rectangular pulse 152a, and rectangular pulse 162b corresponds to rectangular pulse 152b.

In some embodiments, sub-harmonic mixer 120, band-pass filter 130, and FET T1 can be implemented on a common substrate 102, e.g., in a single integrated circuit.

Figure 2A:
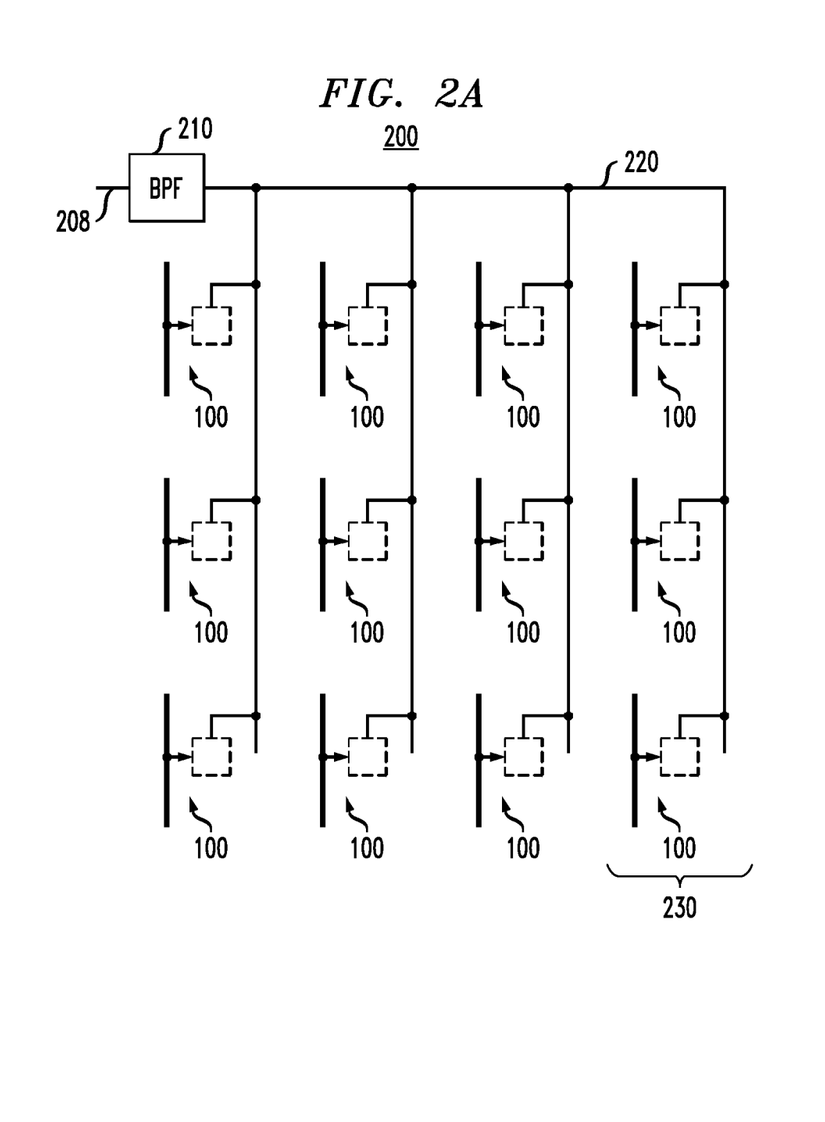
FIG. 2A shows a block diagram of an arrayed antenna that includes a plurality of the antenna cells shown in FIG. 1 according to an embodiment of the disclosure.
Figure 2B:
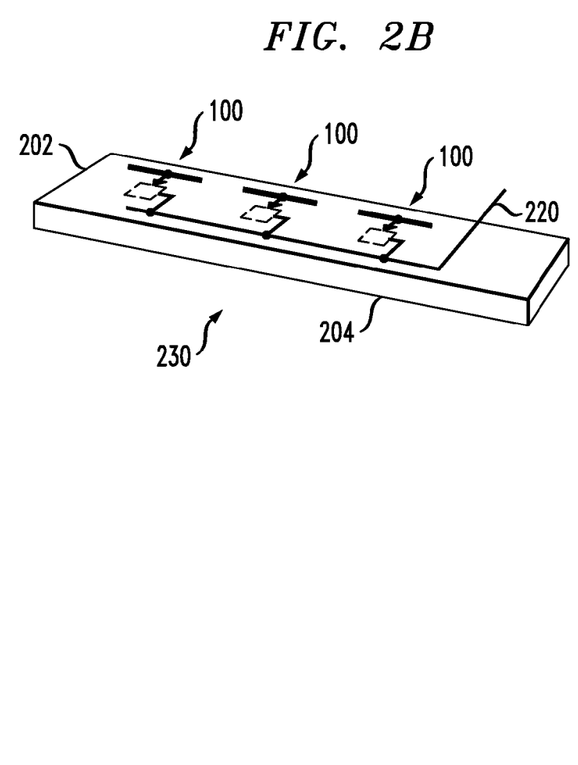
FIG. 2B shows a three-dimensional view of a portion of the arrayed antenna of FIG. 2A according to an embodiment of the disclosure.

FIGS. 2A-2B illustrate an arrayed antenna 200 that includes a plurality of antenna cells 100 (FIG. 1A) according to an embodiment of the disclosure. More specifically, FIG. 2A shows a block diagram of arrayed antenna 200. FIG. 2B shows a three-dimensional view of a portion 230 of arrayed antenna 200 (FIG. 2A). Antenna 200 is illustratively shown in FIG. 2A as comprising twelve antenna cells 100 arranged in a two-dimensional rectangular array and electrically connected in parallel using a network of electrical conductors 220. In an alternative embodiment, antenna 200 may have more or fewer than twelve antenna cells 100. Other spatial arrangements and electrical connections of antenna cells 100 are also contemplated. In response to electromagnetic radiation received from a remote millimeter-wave or terahertz source, antenna 200 generates an electrical output signal at an output terminal 208. The generated electrical output signal can then be used for an intended purpose in a device or circuit coupled to output terminal 208.

In one embodiment, the twelve antenna cells 100 in antenna 200 can be fabricated on a common substrate or base 202, e.g., as indicated in FIG. 2B. A first side of base 202 has the network of electrical conductors 220, e.g., formed on the surface thereof. An opposite second side of base 202 has an electrically conducting (e.g., metallic) backplane 204 that can serve as a common ground terminal for the different antenna cells 100 in antenna 200. As indicated in FIG. 1A, a ground terminal is used in an individual antenna cell 100 in connection with FET T1. One of ordinary skill in the art will appreciate that the ground terminal may also be used, e.g., in a power-supply sub-circuit of antenna cell 100 and/or to provide a reference level for LO signal 118.

In an example embodiment, each antenna cell 100 in antenna 200 has a linear size that is about one half of wavelength λ of the electromagnetic radiation that antenna 200 is designed to receive. A distance between (e.g., the geometric centers of) neighboring antenna cells 100 in antenna 200 may be about one wavelength λ. Distances between neighboring columns and rows of antenna cells 100 in the spatial array of antenna 200 may or may not be the same.

In some embodiments, a linear size (e.g., a side length or a distance between two corner antenna cells, such as, in the view shown in FIG. 2A, the bottom left corner cell 100 and the top right corner cell 100) of antenna 200 is much smaller (e.g., by a factor of 10 or more) than a "symbol length" in the received electromagnetic radiation. The term "symbol length" applies to embodiments in which antenna 200 is configured to receive electromagnetic radiation having a carrier frequency that is modulated with data using regular time intervals referred to as symbol periods. The symbol length can be calculated by multiplying the duration of a symbol period (e.g., in seconds) by the speed of light. As an example, FIG. 1B indicates a symbol period T for electromagnetic wave 140. Depending on the particular application, a linear size of antenna 200 may vary from approximately 1 mm to several meters. In some embodiments, the total area of antenna 200 may be much larger (e.g., by a factor of about 100 or more) than $\lambda^2$ due to a relatively large number of antenna cells 100 used therein.

In some embodiments, antenna 200 may have relatively low directivity, e.g., due to the relatively low directivity of individual antenna cells 100. The gain of antenna 200 may be approximately proportional to the effective area occupied by antenna cells 100 therein.

In operation, the electrical connections between antenna cells 100 in antenna 200 and the above-explained linear size of the antenna cause the electrical currents 136 (see FIG. 1A) generated by the individual antenna cells 100 to be summed constructively at the input of an electrical band-pass filter (BPF) 210. Due to this property, antenna 200 is capable of producing a relatively strong output signal at output terminal 208. Advantageously, the gain of antenna 200 can be significantly larger than the gain of an individual antenna cell 100 therein.

In some embodiments, BPF 210 may have a relatively low lower cut-off frequency. In some embodiments, BPF 210 may be replaced by a corresponding low-pass filter configured to suppress unwanted signal harmonics.

Figure 3:
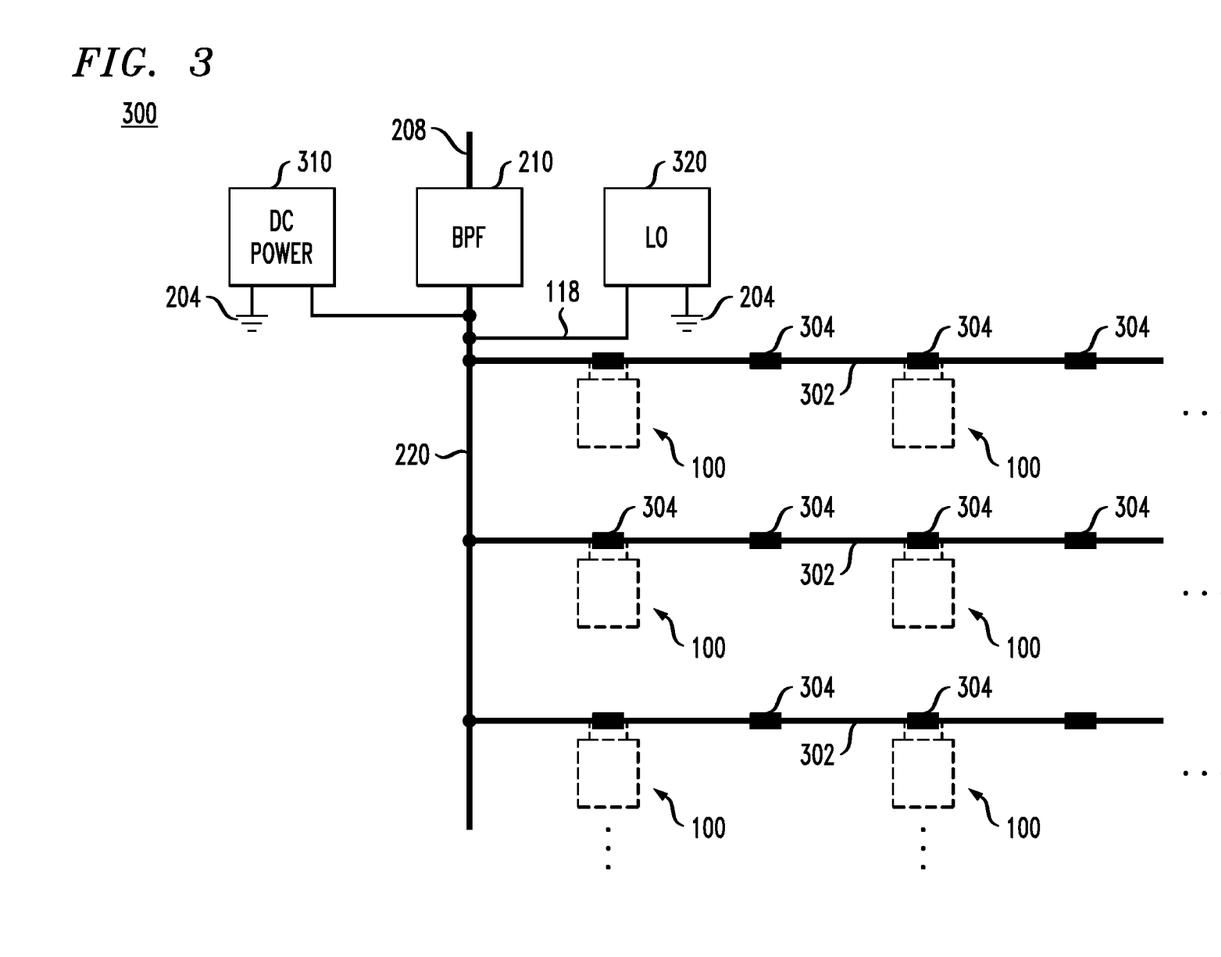
FIG. 3 shows a block diagram of an electrical circuit that can be used in the arrayed antenna of FIG. 2 according to an embodiment of the disclosure.

FIG. 3 shows a block diagram of an electrical circuit 300 that can be used in antenna 200 (FIG. 2) according to an embodiment of the disclosure. More specifically, circuit 300 is designed so that electrical conductors 220 (FIG. 2) can be used for two or more purposes. A first purpose is to collect the electrical output signals 136 generated by different antenna cells 100 in response to the received electromagnetic radiation and apply a resulting collected electrical signal to filter 210, e.g., as already described above in reference to FIG. 2. A second purpose may be to deliver electrical DC power from a power supply 310 to electrical circuits in different antenna cells 100 in arrayed antenna 200. A third purpose may be to deliver the electrical LO signal 118 from a local-oscillator source 320 to the different antenna cells 100 in antenna 200. In the embodiment shown in FIG. 3, electrical conductors 220 are configured for all three aforementioned purposes. However, in an alternative embodiment, electrical conductors 220 may be used for only two of the three purposes. For example, in one alternative embodiment, electrical conductors 220 may be used for the first and second purposes. If necessary, a separate network of electrical conductors (not shown in FIG. 3) may be used for the third purpose. In another alternative embodiment, electrical conductors 220 may be used for the first and third purposes. If necessary, a separate network of electrical conductors may be used for the second purpose.

The ability of the above-mentioned electrical signals to share electrical conductors 220 is based on the fact that these electrical signals have different frequencies that can be separated and/or isolated from one another using filters or frequency-sensitive circuit elements. For example, electrical lines 302 may be designed in a manner that causes portions of these electrical lines to act as inductors, illustratively shown in FIG. 3 as lumped elements 304, that substantially block the frequencies from the millimeter-wave or terahertz range, but allow the lower frequencies, such as those of the electrical LO signal 118 and the electrical output signals 136 to pass with relatively low attenuation. One of ordinary skill in the art will also understand that inductors 304 do not block or attenuate the DC power supplied by power supply 310. Filter 210 can be designed and configured in a relatively straightforward manner to pass the intermediate frequencies of the electrical output signals 136 but block the electrical LO signal 118 generated by local-oscillator source 320 and the DC component generated by power supply 310, thereby causing only signals 136 to appear on output terminal 208.

The above-described use of electrical conductors 220 for multiple purposes may be beneficial, e.g., because it may enable a reduction in the density of electrically conducting tracks to be routed and manufactured on substrate or base 202 (FIG. 2B).

Figure 4:
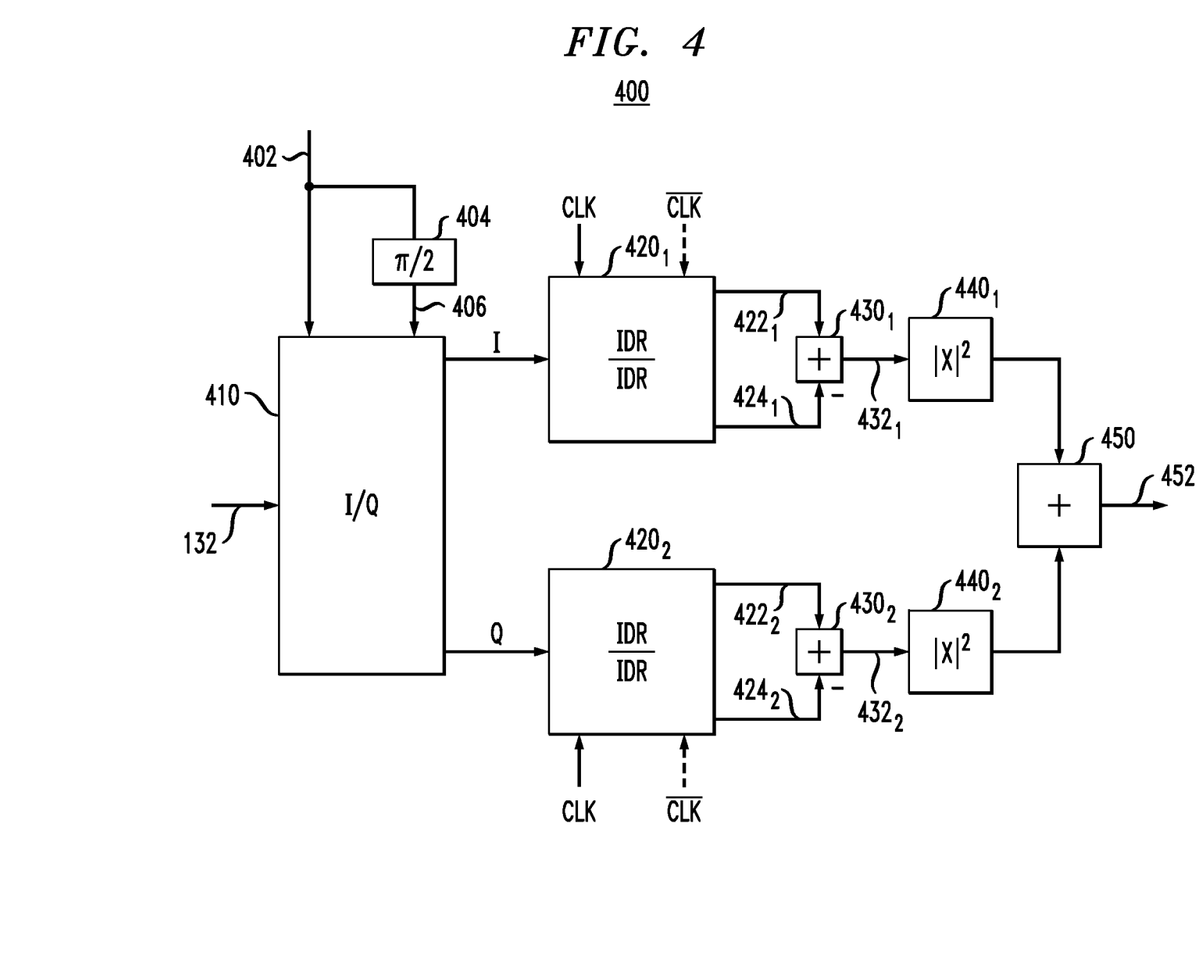
FIG. 4 shows a block diagram of an electrical circuit that can be used in the antenna cell of FIG. 1 according to an embodiment of the disclosure.

FIG. 4 shows a block diagram of an electrical circuit 400 that can be used in antenna cell 100 (FIG. 1A) according to an embodiment of the disclosure. More specifically, electrical circuit 400 may be used to replace FET T1 (see FIG. 1A). As such, electrical circuit 400 is shown in FIG. 4 as being configured to receive filtered electrical signal 132 (see FIG. 1A). An electrical output signal 452 generated by circuit 400 may be applied, e.g., to electrical conductors 220 (see FIG. 2A).

Recall that electrical signal 132 is an intermediate-frequency signal. Circuit 400 has a baseband converter 410 configured to further down-convert electrical signal 132 to baseband in the form of baseband signals, labeled I and Q. Baseband signal I is an in-phase signal generated in baseband converter 410 by mixing signal 132 with a second electrical LO signal 402. Baseband signal Q is a quadrature signal generated in baseband converter 410 by mixing signal 132 with a phase-shifted copy of LO signal 402, labeled 406. As indicated in FIG. 4, signal 406 is generated in circuit 400 by applying a phase shift of 90 degrees to signal 402 using a phase-shifter 404. The frequency of electrical LO signal 402 depends on the frequency of electrical LO signal 118 and is selected to cause the frequency spectrum of signals I and Q to be in the baseband.

Circuit modules 420 and 430 are configured to implement differential detection of baseband signals I and Q. More specifically, a dual integrate-and-dump receiver (IDR) $420_1$ and an adder $430_1$ are configured to implement differential detection of in-phase baseband signal I. A dual integrate-and-dump receiver $420_2$ and an adder $430_2$ are similarly configured to implement differential detection of quadrature baseband signal Q.

In an example embodiment, each dual IDR 420 may include two signal integration modules (not explicitly shown in FIG. 4). Signal integrations in the first and second integration module may be triggered by a clock signal CLK and an inverted clock signal $\overline{\text{CLK}}$, respectively. This causes the integration periods of these two signal integration modules to be shifted in time with respect to each other. The output of the first integration module is applied to adder 430 via an electrical signal 422, and the output of the second integration module is applied to adder 430 via an electrical signal 424. Adder 430 is configured to subtract signal 424 from signal 422, and apply a resulting difference signal 432 to a squaring module 440, as indicated in FIG. 4. An adder 450 then sums squared signals $442_1$ and $442_2$ generated by squaring modules $440_1$ and $440_2$, respectively, to generate electrical output signal 452. Electrical output signal 452 is similar to electrical output signal 136 in that both signals are unipolar signals. This property advantageously enables different individual antenna cells 100 in antenna 200 equipped with circuits 400 to generate a plurality of electrical output signals 452 that can be summed constructively at the input of filter 210. Electrical output signal 452 may however differ from electrical output signal 136 in that electrical output signal 452 is a baseband signal.

One of ordinary skill in the art will understand that circuit 400 may be used in antennas intended for reception of differentially modulated millimeter-wave or terahertz signals. An example modulation format that can be received using circuit 400 is DPSK (differential phase-shift keying).

Example applications for different embodiments of the antenna cells and arrayed antennas disclosed herein are described, e.g., in reference to FIGS. 5-6 in the above-cited U.S. patent application Ser. No. 14/496,312 by Lothar Moeller.

According to an example embodiment disclosed above in reference to FIGS. 1-4, provided is an apparatus (e.g., 200, FIG. 2) comprising a plurality of antenna cells (e.g., 100, FIG. 1A) electrically connected with one another and configured to generate an electrical output signal in response to electromagnetic radiation from a millimeter-wave or terahertz range received by the plurality of the antenna cells. Each of the antenna cells is configured to perform coherent detection of the electromagnetic radiation and comprises (i) a respective antenna structure (e.g., 110, FIG. 1A) and (ii) a respective electrical down-converter circuit (e.g., 120, 130, T1, FIG. 1A; 400, FIG. 4) coupled to the respective antenna structure and configured to generate a respective component of the electrical output signal by mixing a first local oscillator signal (e.g., 118, FIG. 1A) and an electrical signal (e.g., 112, FIG. 1A) generated by the respective antenna structure in response to the electromagnetic radiation. The plurality of the antenna cells are electrically connected with one another to combine said respective components in a manner that causes the electrical output signal to have a greater power than a power of any of said respective components.

In some embodiments of the above apparatus, the plurality of the antenna cells are connected in parallel between a first common electrical conductor (e.g., 220, FIG. 2) and a second common electrical conductor (e.g., 204, FIG. 2B); each of said respective components is a respective electrical-current component; and the respective down-converter circuits are configured to cause said respective electrical-current components to have a same polarity to add constructively at one of the first and second common electrical conductors.

In some embodiments of any of the above apparatus, said one (e.g., 220, FIG. 2) of the first and second common electrical conductors is configured to supply the first local oscillator signal to each of the respective electrical down-converter circuit in each of the plurality of the antenna cells (e.g., as shown in FIG. 3).

In some embodiments of any of the above apparatus, said one of the first and second common electrical conductors is configured to supply electrical DC power to each of the plurality of the antenna cells (e.g., as shown in FIG. 3).

In some embodiments of any of the above apparatus, the apparatus further comprises: a local-oscillator source (e.g., 320, FIG. 3) configured to generate the first local oscillator signal; and a power supply circuit (e.g., 310, FIG. 3) configured to apply the electrical DC power to said one of the first and second common electrical conductors.

In some embodiments of any of the above apparatus, the apparatus further comprises a band-pass filter (e.g., 210, FIG. 3) coupled to said one of the first and second common electrical conductors and configured to separate the electrical output signal and the first local oscillator signal.

In some embodiments of any of the above apparatus, said one (e.g., 220, FIG. 2) of the first and second common electrical conductors is configured to have an inductance (e.g., 304, FIG. 3) that blocks propagation between the antenna cells of electrical signals having frequencies in the millimeter-wave or terahertz range.

In some embodiments of any of the above apparatus, the plurality of the antenna cells are arranged in a spatial array on a surface of a common base (e.g., 202, FIG. 2B).

In some embodiments of any of the above apparatus, the surface is non-planar.

In some embodiments of any of the above apparatus, the apparatus is configured to generate the electrical output signal in response to the electromagnetic radiation having a carrier wavelength.

In some embodiments of any of the above apparatus, the plurality of the antenna cells are arranged in a spatial array in which directly spatially adjacent antenna cells are spaced by a distance that is approximately equal to (e.g., within +/−50% of) the carrier wavelength.

In some embodiments of any of the above apparatus, each of the plurality of the antenna cells has a linear size that is approximately one half (e.g., within $0.25\lambda$ to $0.75\lambda$) of the carrier wavelength ($\lambda$).

In some embodiments of any of the above apparatus, the apparatus is configured to generate the electrical output signal in response to the electromagnetic radiation that is modulated with data over a sequence of symbol periods.

In some embodiments of any of the above apparatus, the spatial array has a linear size that is smaller than a symbol length in the modulated electromagnetic radiation.

In some embodiments of any of the above apparatus, the plurality of antenna cells includes at least 3 antenna cells.

In some embodiments of any of the above apparatus, the plurality of antenna cells includes at least 10 antenna cells.

In some embodiments of any of the above apparatus, the plurality of antenna cells includes at least 100 antenna cells.

In some embodiments of any of the above apparatus, the plurality of the antenna cells have been fabricated on a common substrate (e.g., 202, FIG. 2B) and are parts of a single integrated-circuit die.

In some embodiments of any of the above apparatus, the respective electrical down-converter circuit comprises: a sub-harmonic mixer (e.g., 120, FIG. 1A) configured to mix the first local oscillator signal (e.g., 118, FIG. 1A) and the electrical signal (e.g., 112, FIG. 1A) generated by the respective antenna structure in response to the electromagnetic radiation to generate a mixed electrical signal (e.g., 122, FIG. 1A); and a band-pass filter (e.g., 130, FIG. 1A) configured to filter the mixed electrical signal in a manner that removes unwanted frequencies therefrom to generate a filtered electrical signal (e.g., 132, FIG. 1A). The respective electrical down-converter circuit is configured to generate the respective component of the electrical output signal based on said filtered electrical signal (e.g., as shown in FIG. 1A or FIG. 4).

In some embodiments of any of the above apparatus, the respective electrical down-converter circuit further comprises a field-effect transistor (e.g., T1, FIG. 1A) whose gate is configured to receive and be controlled by said filtered electrical signal.

In some embodiments of any of the above apparatus, the respective electrical down-converter circuit further comprises: a baseband converter (e.g., 410, FIG. 4) configured to: generate an electrical in-phase baseband signal (e.g., I, FIG. 4) by mixing the filtered electrical signal and a second electrical local-oscillator signal (e.g., 402, FIG. 4); and generate an electrical quadrature baseband signal (e.g., Q, FIG. 4) by mixing the filtered electrical signal and a phase-shifted copy (e.g., 406, FIG. 4) of the second electrical local-oscillator signal; a first integrate-and-dump receiver (e.g., 420$_1$, FIG. 4) configured to integrate the in-phase baseband signal to generate a first integrated electrical signal; and a second integrate-and-dump receiver (e.g., 420$_2$, FIG. 4) configured to integrate the quadrature baseband signal to generate a second integrated electrical signal. The respective electrical down-converter circuit is configured to generate the respective component of the electrical output signal based on said first and second integrated electrical signals (e.g., as shown in FIG. 4).

In some embodiments of any of the above apparatus, the respective electrical down-converter circuit is configured to demodulate a differentially modulated signal carried by the electromagnetic radiation (e.g., using 420, 430, 440, 450, as shown in FIG. 4).

While this disclosure includes references to illustrative embodiments, this specification is not intended to be construed in a limiting sense.

For example, some embodiments may also be used with microwave radiation, e.g., having frequencies between about 1 GHz and about 30 GHz.

Antenna structures in different antenna cells of the arrayed antenna may have the same orientation or different orientations.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

What is claimed is:

1. An apparatus comprising a plurality of antenna cells electrically connected with one another and configured to generate an electrical output signal in response to electromagnetic radiation from a millimeter-wave or terahertz range received by the plurality of the antenna cells, wherein:

each of the antenna cells is configured to perform coherent detection of the electromagnetic radiation and comprises (i) a respective antenna structure and (ii) a respective electrical down-converter circuit coupled to the respective antenna structure and configured to generate a respective component of the electrical output signal by mixing a first local oscillator signal and an electrical signal generated by the respective antenna structure in response to the electromagnetic radiation;

the plurality of the antenna cells are electrically connected with one another to combine said respective components in a manner that causes the electrical output signal to have a greater power than a power of any of said respective components;

the apparatus is configured to generate the electrical output signal in response to the electromagnetic radiation having a carrier wavelength;

the plurality of the antenna cells are arranged in a spatial array in which directly spatially adjacent antenna cells are spaced by a distance that is approximately equal to the carrier wavelength;

the apparatus is configured to generate the electrical output signal in response to the electromagnetic radiation that is modulated with data over a sequence of symbol periods; and the spatial array has a linear size that is smaller than a symbol length in the modulated electromagnetic radiation.

2. The apparatus of claim 1, wherein:
the plurality of the antenna cells are connected in parallel between a first common electrical conductor and a second common electrical conductor;
each of said respective components is a respective electrical-current component; and
the respective down-converter circuits are configured to cause said respective electrical-current components to have a same polarity to add constructively at one of the first and second common electrical conductors.

3. The apparatus of claim 2, wherein said one of the first and second common electrical conductors is configured to supply the first local oscillator signal to each of the respective electrical down-converter circuit in each of the plurality of the antenna cells.

4. The apparatus of claim 3, wherein said one of the first and second common electrical conductors is further configured to supply electrical DC power to each of the plurality of the antenna cells.

5. The apparatus of claim 4, further comprising:
a local-oscillator source configured to generate the first local oscillator signal; and
a power supply circuit configured to apply the electrical DC power to said one of the first and second common electrical conductors.

6. The apparatus of claim 3, further comprising a band-pass filter coupled to said one of the first and second common electrical conductors and configured to separate the electrical output signal and the first local oscillator signal.

7. The apparatus of claim 2, wherein said one of the first and second common electrical conductors is configured to supply electrical DC power to each of the plurality of the antenna cells.

8. The apparatus of claim 2, wherein said one of the first and second common electrical conductors is configured to have an inductance that blocks propagation between the antenna cells of electrical signals having frequencies in the millimeter-wave or terahertz range.

9. The apparatus of claim 1,
wherein the plurality of the antenna cells are arranged in a spatial array on a surface of a common base; and
wherein the surface is non-planar.

10. The apparatus of claim 1, wherein each of the plurality of the antenna cells has a linear size that is approximately one half of the carrier wavelength.

11. The apparatus of claim 1, wherein the plurality of antenna cells includes at least 3 antenna cells.

12. The apparatus of claim 11, wherein the plurality of antenna cells includes at least 10 antenna cells.

13. The apparatus of claim 11, wherein the plurality of antenna cells includes at least 100 antenna cells.

14. The apparatus of claim 1, wherein the plurality of the antenna cells have been fabricated on a common substrate and are parts of a single integrated-circuit die.

15. The apparatus of claim 1, wherein the respective electrical down-converter circuit comprises:
a sub-harmonic mixer configured to mix the first local oscillator signal and the electrical signal generated by the respective antenna structure in response to the electromagnetic radiation to generate a mixed electrical signal; and
a band-pass filter configured to filter the mixed electrical signal in a manner that removes unwanted frequencies therefrom to generate a filtered electrical signal; and
wherein the respective electrical down-converter circuit is configured to generate the respective component of the electrical output signal based on said filtered electrical signal.

16. The apparatus of claim 15, wherein the respective electrical down-converter circuit further comprises a field-effect transistor whose gate is configured to receive and be controlled by said filtered electrical signal.

17. The apparatus of claim 15, wherein the respective electrical down-converter circuit further comprises:
a baseband converter configured to:
generate an electrical in-phase baseband signal by mixing the filtered electrical signal and a second electrical local-oscillator signal; and
generate an electrical quadrature baseband signal by mixing the filtered electrical signal and a phase-shifted copy of the second electrical local-oscillator signal;
a first integrate-and-dump receiver configured to integrate the in-phase baseband signal to generate a first integrated electrical signal; and
a second integrate-and-dump receiver configured to integrate the quadrature baseband signal to generate a second integrated electrical signal; and
wherein the respective electrical down-converter circuit is configured to generate the respective component of the electrical output signal based on said first and second integrated electrical signals.

18. The apparatus of claim 17, wherein the respective electrical down-converter circuit is configured to demodulate a differentially modulated signal carried by the electromagnetic radiation.

19. The apparatus of claim 17, wherein the respective electrical down-converter circuit is configured to demodulate a differentially modulated signal carried by the electromagnetic radiation.

20. An apparatus comprising a plurality of antenna cells electrically connected with one another and configured to generate an electrical output signal in response to electromagnetic radiation from a millimeter-wave or terahertz range received by the plurality of the antenna cells, wherein:
each of the antenna cells is configured to perform coherent detection of the electromagnetic radiation and comprises (i) a respective antenna structure and (ii) a respective electrical down-converter circuit coupled to the respective antenna structure and configured to generate a respective component of the electrical output signal by mixing a first local oscillator signal and an electrical signal generated by the respective antenna structure in response to the electromagnetic radiation;
the plurality of the antenna cells are electrically connected with one another to combine said respective components in a manner that causes the electrical output signal to have a greater power than a power of any of said respective components;
the plurality of the antenna cells are connected in parallel between a first common electrical conductor and a second common electrical conductor;
each of said respective components is a respective electrical-current component;
the respective down-converter circuits are configured to cause said respective electrical-current components to have a same polarity to add constructively at one of the first and second common electrical conductors;
said one of the first and second common electrical conductors is configured to supply the first local oscillator signal to each of the respective electrical down-converter circuit in each of the plurality of the antenna cells; and the apparatus further comprises a band-pass filter coupled to said one of the first and second common electrical conductors and configured to separate the electrical output signal and the first local oscillator signal.

21. An apparatus comprising a plurality of antenna cells electrically connected with one another and configured to generate an electrical output signal in response to electromagnetic radiation from a millimeter-wave or terahertz range received by the plurality of the antenna cells, wherein:

each of the antenna cells is configured to perform coherent detection of the electromagnetic radiation and comprises (i) a respective antenna structure and (ii) a respective electrical down-converter circuit coupled to the respective antenna structure and configured to generate a respective component of the electrical output signal by mixing a first local oscillator signal and an electrical signal generated by the respective antenna structure in response to the electromagnetic radiation;

the plurality of the antenna cells are electrically connected with one another to combine said respective components in a manner that causes the electrical output signal to have a greater power than a power of any of said respective components;

the plurality of the antenna cells are connected in parallel between a first common electrical conductor and a second common electrical conductor;

each of said respective components is a respective electrical-current component;

the respective down-converter circuits are configured to cause said respective electrical-current components to have a same polarity to add constructively at one of the first and second common electrical conductors; and said one of the first and second common electrical conductors is configured to have an inductance that blocks propagation between the antenna cells of electrical signals having frequencies in the millimeter-wave or terahertz range.

22. An apparatus comprising a plurality of antenna cells electrically connected with one another and configured to generate an electrical output signal in response to electromagnetic radiation from a millimeter-wave or terahertz range received by the plurality of the antenna cells, wherein:

each of the antenna cells is configured to perform coherent detection of the electromagnetic radiation and comprises (i) a respective antenna structure and (ii) a respective electrical down-converter circuit coupled to the respective antenna structure and configured to generate a respective component of the electrical output signal by mixing a first local oscillator signal and an electrical signal generated by the respective antenna structure in response to the electromagnetic radiation;

the plurality of the antenna cells are electrically connected with one another to combine said respective components in a manner that causes the electrical output signal to have a greater power than a power of any of said respective components;

the respective electrical down-converter circuit comprises:

a sub-harmonic mixer configured to mix the first local oscillator signal and the electrical signal generated by the respective antenna structure in response to the electromagnetic radiation to generate a mixed electrical signal; and a band-pass filter configured to filter the mixed electrical signal in a manner that removes unwanted frequencies therefrom to generate a filtered electrical signal;

the respective electrical down-converter circuit is configured to generate the respective component of the electrical output signal based on said filtered electrical signal; and the respective electrical down-converter circuit further comprises a field-effect transistor whose gate is configured to receive and be controlled by said filtered electrical signal.

23. An apparatus comprising a plurality of antenna cells electrically connected with one another and configured to generate an electrical output signal in response to electromagnetic radiation from a millimeter-wave or terahertz range received by the plurality of the antenna cells, wherein:

each of the antenna cells is configured to perform coherent detection of the electromagnetic radiation and comprises (i) a respective antenna structure and (ii) a respective electrical down-converter circuit coupled to the respective antenna structure and configured to generate a respective component of the electrical output signal by mixing a first local oscillator signal and an electrical signal generated by the respective antenna structure in response to the electromagnetic radiation;

the plurality of the antenna cells are electrically connected with one another to combine said respective components in a manner that causes the electrical output signal to have a greater power than a power of any of said respective components;

the respective electrical down-converter circuit comprises:

a sub-harmonic mixer configured to mix the first local oscillator signal and the electrical signal generated by the respective antenna structure in response to the electromagnetic radiation to generate a mixed electrical signal; and a band-pass filter configured to filter the mixed electrical signal in a manner that removes unwanted frequencies therefrom to generate a filtered electrical signal;

the respective electrical down-converter circuit is configured to generate the respective component of the electrical output signal based on said filtered electrical signal;

the respective electrical down-converter circuit further comprises:

a baseband converter configured to:
generate an electrical in-phase baseband signal by mixing the filtered electrical signal and a second electrical local-oscillator signal; and
generate an electrical quadrature baseband signal by mixing the filtered electrical signal and a phase-shifted copy of the second electrical local-oscillator signal;

a first integrate-and-dump receiver configured to integrate the in-phase baseband signal to generate a first integrated electrical signal; and a second integrate-and-dump receiver configured to integrate the quadrature baseband signal to generate a second integrated electrical signal; and the respective electrical down-converter circuit is configured to generate the respective component of the electrical output signal based on said first and second integrated electrical signals.

* * * * *